United States Patent
Oi et al.

(10) Patent No.: US 9,616,753 B2
(45) Date of Patent: Apr. 11, 2017

(54) ELECTRIC POWER CONVERSION CONTROL DEVICE FOR VEHICLE, CONTROL METHOD, AND VEHICLE EQUIPPED THEREWITH

(71) Applicant: TOYOTA JIDOSHA KABUSHIKI KAISHA, Toyota-shi, Aichi-ken (JP)

(72) Inventors: Shohei Oi, Toyota (JP); Tomoko Oba, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 31 days.

(21) Appl. No.: 14/690,642

(22) Filed: Apr. 20, 2015

(65) Prior Publication Data

US 2015/0298551 A1    Oct. 22, 2015

(30) Foreign Application Priority Data

Apr. 21, 2014  (JP) ................................. 2014-087353

(51) Int. Cl.
*F04D 15/00* (2006.01)
*B60D 1/28* (2006.01)
(Continued)

(52) U.S. Cl.
CPC ............. *B60L 3/0023* (2013.01); *B60L 3/003* (2013.01); *B60L 3/0007* (2013.01); *B60W 10/00* (2013.01);
(Continued)

(58) Field of Classification Search
CPC ...... B60L 3/0023; B60L 3/0007; B60L 3/003; B60L 3/0015; B60L 2210/14;
(Continued)

(56) References Cited

U.S. PATENT DOCUMENTS 8,944,198 B2 * 2/2015 Miyazaki ................ B60L 1/003
                                                                180/271
2003/0081440 A1  5/2003 Komatsu et al.
(Continued)

FOREIGN PATENT DOCUMENTS

| CN | 103561993 A | 2/2014 |
|----|-------------|--------|
| JP | 2003-244801 | 8/2003 |
| JP | 2011-10406  | 1/2011 |

*Primary Examiner* — Bentsu Ro
*Assistant Examiner* — Zemenay Truneh
(74) *Attorney, Agent, or Firm* — Finnegan, Henderson, Farabow, Garrett & Dunner, LLP

(57) ABSTRACT

Disclosed is an electric power conversion control device, in which when an overvoltage abnormality of an electric power system is detected, and it is detected that a vehicle is not in collision, a switching control unit stops the switching of an inverter, whereby an element of the inverter is prevented from being subjected to an overvoltage. In a case where an overvoltage abnormality of the electric power system is detected, and when it is detected that the vehicle is in collision, the switching control unit performs the switching of the inverter, whereby electrical energy of the electric power system is rapidly consumed by a motor generator. Accordingly, it is possible to properly control the switching of an electric converter depending on whether an overvoltage abnormality occurs and a vehicle is in collision.

3 Claims, 4 Drawing Sheets

(51) Int. Cl.
    *B60L 3/00*          (2006.01)
    *B60W 10/00*       (2006.01)
    *B60L 1/00*          (2006.01)

(52) U.S. Cl.
    CPC .............. *B60L 1/00* (2013.01); *B60L 2210/14* (2013.01); *B60L 2210/30* (2013.01); *B60L 2210/40* (2013.01); *B60L 2220/42* (2013.01); *B60L 2240/526* (2013.01); *B60L 2240/527* (2013.01); *Y02T 10/648* (2013.01); *Y02T 10/7241* (2013.01)

(58) Field of Classification Search
    CPC .... B60L 11/1877; B60L 1/003; B60L 1/0007; B60L 3/0046; B60L 3/0069; B60L 3/04; B60L 11/1803; B60L 11/1874; B60W 10/00; H01M 10/0525; H01M 10/345
    USPC ........... 318/3; 180/65.1, 68.5, 271; 340/436, 340/438, 455; 454/75
    See application file for complete search history.

(56) References Cited

U.S. PATENT DOCUMENTS

2012/0070706 A1*   3/2012   Miyazaki ................ B60L 1/003
                                                        429/61
2014/0095005 A1     4/2014   Kanzaki et al.

* cited by examiner

ELECTRIC POWER CONVERSION CONTROL DEVICE FOR VEHICLE, CONTROL METHOD, AND VEHICLE EQUIPPED THEREWITH

PRIORITY INFORMATION

This application claims priority to Japanese Patent Application No. 2014-087353 filed on Apr. 21, 2014, which is incorporated herein by reference in its entirety.

TECHNICAL FIELD

The present invention relates to an electric power conversion control device for a vehicle, which controls the switching of an electric power converter, as well as to a control method and to a vehicle equipped with the control device.

BACKGROUND ART

In a technology disclosed in JP 2003-244801 A, when an overvoltage abnormality occurs in an electric power system including an electric power converter, the switching of the electric power converter is stopped so as to prevent application of an overvoltage to an element of the electric power converter. In a technology disclosed in JP 2011-10406 A, when a vehicle is in collision, the switching of the electric converter is performed so as to discharge a capacitor in the electric power system.

When connection between an electric power source and the electric converter is cut off due to collision of the vehicle, electrical power cannot be recovered by the electric power source, and an overvoltage abnormality may occur in the electric power system. In this case, when the switching of the electric converter is stopped as disclosed in JP-A-2003-244801, it becomes difficult to discharge the capacitor in the electric power system, and when the vehicle is in collision, as disclosed in JP-A-2011-10406, it becomes difficult to rapidly decrease a high voltage in the electric power system.

An object of the present invention is to properly control the switching of an electric converter depending on whether an overvoltage abnormality occurs and a vehicle is in collision.

SUMMARY OF THE INVENTION

An electric power conversion control device for a vehicle according to the present invention adopts the following means so as to achieve the object.

According to an aspect of the present invention, there is provided an electric power conversion control device for a vehicle, equipped on a vehicle including an electric power system that has an electric power converter for performing electric power conversion via the switching of a switching element, and supplies electrical power from the electric power converter to a rotation machine, the electric power conversion control device for a vehicle having a switching control unit configured to control the switching, an overvoltage abnormality detection unit configured to detect an overvoltage abnormality of the electric power system, and a collision detection unit configured to detect collision of the vehicle. When the overvoltage abnormality detection unit detects an overvoltage abnormality, and the collision detection unit detects that the vehicle is not in collision, the switching control unit stops the switching. Even when the overvoltage abnormality detection unit detects an overvoltage abnormality, the switching control unit performs the switching based on collision conditions in which the collision detection unit detects collision of the vehicle.

According to the aspect of the present invention, in a case where the overvoltage abnormality detection unit detects an overvoltage abnormality, the collision detection unit detects that the vehicle is in collision, and a voltage of the rotation machine or the electric power system exceeds an allowable value, the switching control unit preferably stops the switching, and when the voltage of the rotating machine or the electric power system is the allowable value or less, the switching control unit preferably performs the switching.

According to the aspect of the present invention, preferably, the switching control unit increases the allowable value with an increase in the amount of time elapsed after the collision detection unit detects collision of the vehicle.

According to the present invention, when an overvoltage abnormality of the electric power system is detected, and it is detected that the vehicle is not in collision, it is possible to prevent application of an overvoltage to the electric power converter, by stopping the switching of the electric power converter. In contrast, even when an overvoltage abnormality of the electric power system is detected, it is possible to rapidly prevent a high voltage from remaining in the electric power system, by performing the switching of the electric power converter based on collision condition in which it is detected that the vehicle is in collision. Accordingly, it is possible to properly control the switching of the electric power converter depending on whether an overvoltage abnormality occurs and the vehicle is in collision.

BRIEF DESCRIPTION OF THE DRAWINGS

Preferred embodiments of the present invention will be described in detail based on the following figures wherein.

DESCRIPTION OF THE EMBODIMENTS

Figure 1:
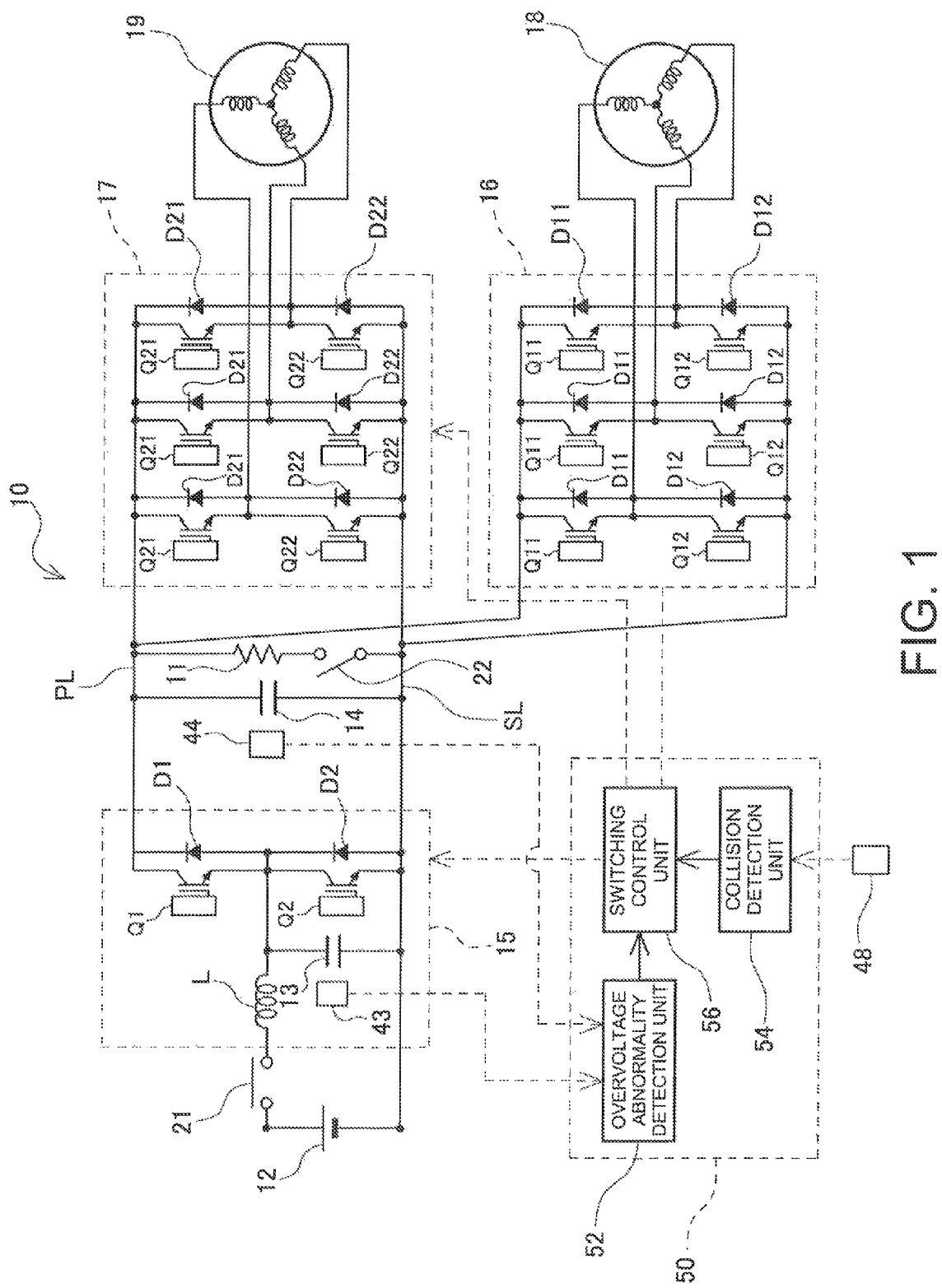
FIG. 1 is a circuit diagram illustrating an example configuration of an electric motor drive system configured to include an electric power conversion control device for a vehicle according to an embodiment of the present invention.

FIG. 1 is a circuit diagram illustrating an example configuration of an electric motor drive system configured to include an electric power conversion control device for a vehicle according to the embodiment of the present invention. For example, the electric motor drive system according to the embodiment can be used as a drive system for a vehicle 100, and the vehicle 100 includes an electric power system 10 having a rechargeable battery 12, a boost converter (DC-DC converter) 15, and inverters 16 and 17; motor generators (rotating machines) 18 and 19 to which electrical power is supplied from the electric power system 10; and an electronic control unit (ECU) 50 that controls the driving of the boost converter 15 and the inverters 16 and 17.

In the electric power system 10, a chargeable and dischargeable direct current power source is provided as the rechargeable battery 12, and a relay 21 is provided between the rechargeable battery 12 and the boost converter 15. When the relay 21 is turned on, the boost converter 15 can perform an electric power conversion operation of boosting a direct voltage from the rechargeable battery 12 by the switching, and output the boosted direct voltage to the inverters 16 and 17. In the example illustrated in FIG. 1, the boost converter 15 includes switching elements Q1 and Q2 connected in series to each other between a positive line (electric power source line) PL and a negative line (ground line) SL of the inverters 16 and 17; diodes (rectifier elements) D1 and D2 respectively connected in parallel to the switching elements Q1 and Q2; and an inductor L provided between the relay 21 (a positive terminal of the rechargeable battery 12) and a connection point between the switching elements Q1 and Q2. A capacitor 14 is provided between the positive line PL and the negative line SL, and stores electrical power output from the boost converter 15. In addition, a discharge resistor 11 and a switch 22 are provided between the positive line PL and the negative line SL, and when the switch 22 is turned on, the capacitor 14 can be discharged via the discharge resistor 11. In contrast, it is also possible to charge the rechargeable battery 12 with electrical power stored in the capacitor 14 by performing the switching of the boost converter 15. In the electric power system 10, a low voltage side is defined as a side closer to the rechargeable battery 12 than the switching elements Q1 and Q2 in the boost converter 15, and a high voltage side is defined as a side closer to the inverters 16 and 17 than the switching elements Q1 and Q2 in the boost converter 15. A capacitor 13 is provided on the lower voltage side of the boost converter 15 between the negative line SL and the connection point between the switching elements Q1 and Q2.

The inverter 16 acting as an electric power converter can be configured to include three-phase switching elements Q11 and Q12, and diodes (rectifier elements) D11 and D12 respectively connected in parallel to the switching elements Q11 and Q12, which is a well-known configuration. The inverter 16 can perform an electric power conversion operation of converting direct voltages from the boost converter 15 into three-phase alternating voltages different in phase from each other by 120°, via the switching on and off of the three-phase switching elements Q11 and Q12, and supply the three-phase alternating voltages to three-phase coils of the motor generator 18. The motor generator 18 can be driven to rotate by receiving alternating electric power from the inverter 16. In contrast, the inverter 16 can perform an electric power conversion operation of converting alternating voltages of the three-phase coils of the motor generator 18 into direct voltages, via the switching of the switching elements Q11 and Q12, and supply the direct voltages to the boost converter 15.

Similarly, the inverter 17 acting as an electric power converter can be configured to include three-phase switching elements Q21 and Q22, and diodes (rectifier elements) D21 and D22 respectively connected in parallel to the switching elements Q21 and Q22, which is a well-known configuration. The inverter 17 can perform an electric power conversion operation of converting direct voltages from the boost converter 15 into three-phase alternating voltages different in phase from each other by 120°, via the switching on and off of the three-phase switching elements Q21 and Q22, and supply the three-phase alternating voltages to three-phase coils of the motor generator 19. The motor generator 19 can be driven to rotate by receiving alternating electric power from the inverter 17, and power of the motor generator 19 is used for the travelling of the vehicle 100. In contrast, the inverter 17 can perform an electric power conversion operation of converting alternating voltages of the three-phase coils of the motor generator 19 into direct voltages, via the switching of the switching elements Q21 and Q22, and supply the direct voltages to the boost converter 15.

Voltage sensors 43 and 44 are provided in the electric power system 10 so as to detect an overvoltage abnormality of the electric power system 10. In the example illustrated in FIG. 1, the voltage sensor 44 is provided so as to detect a voltage (voltage input to the inverters 16 and 17 from the boost converter 15) VH of the capacitor 14, the voltage VH being a voltage on the high voltage side of the electric power system 10, and the voltage sensor 43 is provided so as to detect a voltage VL of the capacitor 13, the voltage VL being a voltage on the low voltage side of the electric power system 10. A signal indicative of the voltage VH of the capacitor 14 is input to the electronic control device 50 from the voltage sensor 44, and a signal indicative of the voltage VL of the capacitor 13 is input to the electronic control device 50 from the voltage sensor 43. A collision sensor 48 is provided in the vehicle 100 so as to detect collision of the vehicle 100. A signal is also input to the electronic control unit 50 from the collision sensor 48.

In the electronic control unit 50, an overvoltage abnormality detection unit 52 detects an overvoltage abnormality of the electric power system 10, based on the voltage VH of the capacitor 14 detected by the voltage sensor 44 and the voltage VL of the capacitor 13 detected by the voltage sensor 43. For example, when the voltage VH of the capacitor 14 detected by the voltage sensor 44 exceeds a set value VH0, it is determined that an overvoltage abnormality occurs on the high voltage side of the electric power system 10, and when the voltage VL of the capacitor 13 detected by the voltage sensor 43 exceeds a set value VL0, it is determined that an overvoltage abnormality occurs on the low voltage side of the electric power system 10. In contrast, when the voltage VH of the capacitor 14 is the set value VH0 or less, and the voltage VL of the capacitor 13 is the set value VL0 or less, it is determined that an overvoltage abnormality does not occur in the electric power system 10. Here, for example, the set values VH0 and VL0 are respectively set to be less than a withstanding voltage of the element of each of the inverters 16 and 17. A signal indicative of the existence and non-existence of an overvoltage abnormality of the electric power system 10 (high voltage side and low voltage side) is input to a switching control unit 56 from the overvoltage abnormality detection unit 52.

A collision detection unit 54 detects collision of the vehicle 100 based on a signal from the collision sensor 48. For example, when a signal level from the collision sensor 48 exceeds an upper limit level, it is determined that the vehicle 100 is in collision, and when a signal level from the collision sensor 48 is the upper limit level or less, it is determined that the vehicle 100 is not in collision. A signal indicative of the occurrence and non-occurrence of collision of the vehicle 100 is input to the switching control unit 56 from the collision detection unit 54.

The switching control unit 56 controls the switching of the boost converter 15 and the inverters 16 and 17. In the embodiment, when the overvoltage abnormality detection unit 52 detects an overvoltage abnormality of the electric power system 10, and the collision detection unit 54 does not detect collision of the vehicle 100, the switching control unit 56 stops the switching of the inverters 16 and 17. In the embodiment, even when the overvoltage abnormality detection unit 52 detects an overvoltage abnormality of the electric power system 10, the switching control unit 56 performs the switching of the inverters 16 and 17 based on collision conditions in which the collision detection unit 54 detects collision of the vehicle 100.

For example, when an overvoltage abnormality is detected on the high voltage side (the capacitor 14) of the electric power system 10, and it is detected that the vehicle 100 is not in collision, it is possible to prevent application of an overvoltage to the elements of the inverters 16 and 17, by stopping the switching of the inverters 16 and 17. In addition, it is possible to prevent application of an overvoltage to the elements of the boost converter 15 by also stopping the switching of the boost converter 15. At this time, the switch 22 is turned on, whereby the capacitor 14 is discharged via the discharge resistor 11. In contrast, when an overvoltage abnormality is detected on the high voltage side (the capacitor 14) of the electric power system 10, and it is detected that the vehicle 100 is in collision, the switching of the inverters 16 and 17 is performed, whereby an electrical energy of the electric power system 10 (the capacitor 14) can be rapidly consumed by the motor generators 18 and 19, and it is possible to rapidly decrease the voltage VH of the capacitor 14. At this time, even when the switching of the boost converter 15 is stopped, it is possible to discharge the capacitor 14 by operating the motor generators 18 and 19.

When an overvoltage abnormality is detected on the low voltage side (the capacitor 13) of the electric power system 10, and it is detected that the vehicle 100 is not in collision, it is possible to prevent application of an overvoltage to the elements of the inverters 16 and 17, by stopping the switching of the inverters 16 and 17. In addition, it is possible to prevent application of an overvoltage to the elements of the boost converter 15 by also stopping the switching of the boost converter 15. In contrast, when an overvoltage abnormality is detected on the low voltage side (the capacitor 13) of the electric power system 10, and it is detected that the vehicle 100 is in collision, the switching of the inverters 16 and 17 is performed, whereby an electrical energy of the electric power system 10 (the capacitor 13) can be rapidly consumed by the motor generators 18 and 19, and it is possible to rapidly decrease the voltage VL of the capacitor 13. At this time, in a case where it is possible to discharge the capacitor 13 without performing the switching of the boost converter 15, the switching of the boost converter 15 is stopped.

Figure 2:
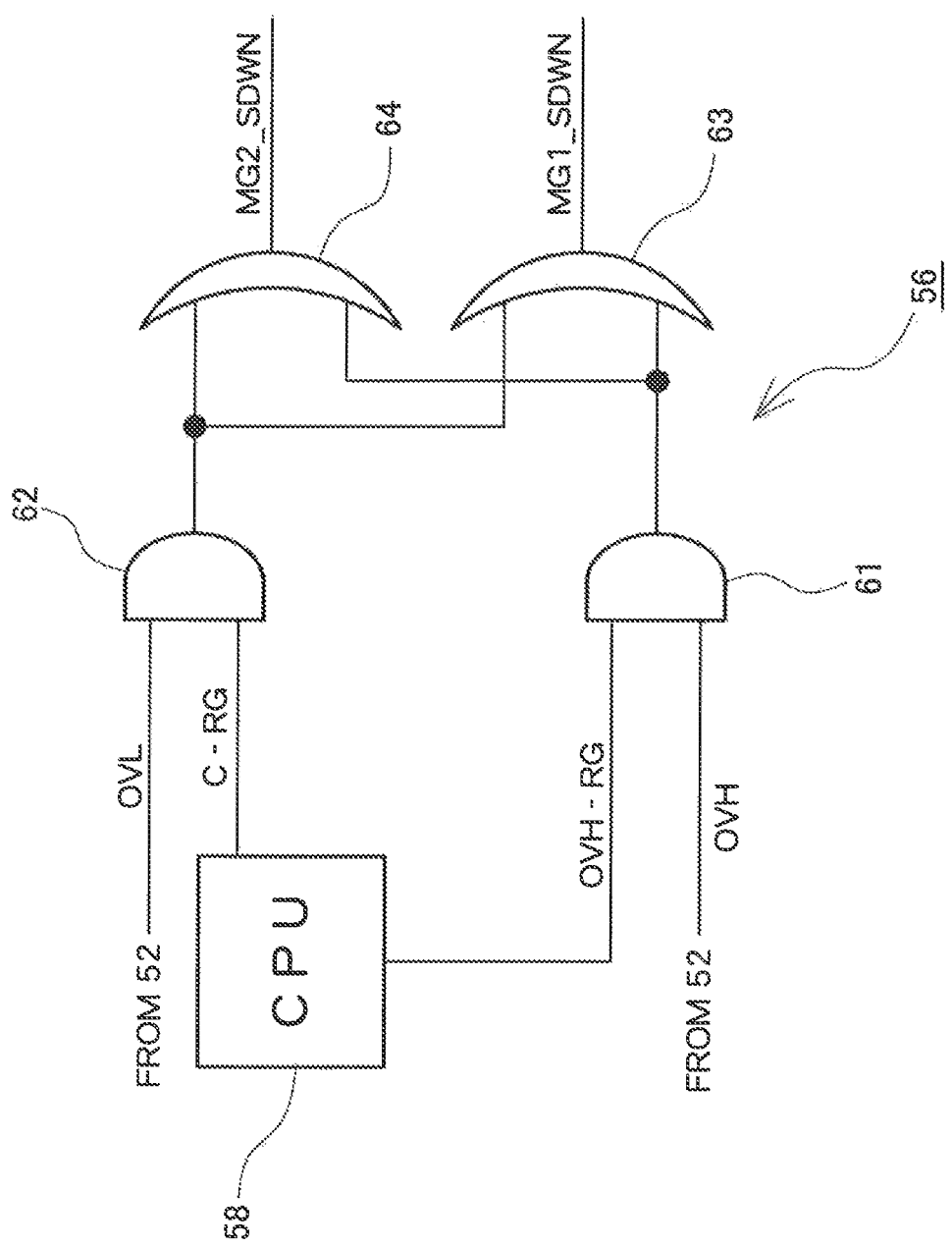
FIG. 2 is a logic diagram illustrating an example of the configuration of a switching control unit.

FIG. 2 illustrates an example configuration of the switching control unit 56. In the example illustrated in FIG. 2, the following signals are input to an AND circuit 61: an OVH signal indicative of the existence and non-existence of an overvoltage abnormality on the high voltage side of the electric power system 10 from the overvoltage abnormality detection unit 52; and an OVH-RG signal from a CPU 58. When the overvoltage abnormality detection unit 52 does not detect an overvoltage abnormality on the high voltage side of the electric power system 10 (VH≤VH0), the level of the OVH signal becomes zero (Low), and when the overvoltage abnormality detection unit 52 detects an overvoltage abnormality on the high voltage side of the electric power system 10 (VH>VH0), the level of the OVH signal becomes one (High). In addition, when the collision detection unit 54 detects that the vehicle 100 is not in collision, the level of the OVH-RG signal becomes one, and when the collision detection unit 54 detects that the vehicle 100 is in collision, the level of the OVH-RG signal becomes zero. An output of the AND circuit 61 is the logical multiplication of the OVH signal and the OVH-RG signal, and when the level of each of the OVH signal and the OVH-RG signal is one, the output of the AND circuit 61 becomes one, and when the level of at least one of the OVH signal and the OVH-RG signal is zero, the output of the AND circuit 61 becomes zero.

The following signals are input to an AND circuit 62: an OVL signal indicative of the existence and non-existence of an overvoltage abnormality on the low voltage side of the electric power system 10 from the overvoltage abnormality detection unit 52; and a C-RG signal from the CPU 58. When the overvoltage abnormality detection unit 52 does not detect an overvoltage abnormality on the low voltage side of the electric power system 10 (VL≤VL0), the level of the OVL signal becomes zero, and when the overvoltage abnormality detection unit 52 detects an overvoltage abnormality on the low voltage side of the electric power system 10 (VL>VL0), the level of the OVL signal becomes one. In addition, when the collision detection unit 54 detects that the vehicle 100 is not in collision, the level of the C-RG signal becomes one, and when the collision detection unit 54 detects that the vehicle 100 is in collision, the level of the C-RG signal becomes zero. An output of the AND circuit 62 is the logical multiplication of the OVL signal and the C-RG signal, and when the level of each of the OVL signal and the C-RG signal is one, the output of the AND circuit 62 becomes one, and when the level of at least one of the OVL signal and the C-RG signal is zero, the output of the AND circuit 62 becomes zero.

An OR circuit 63 computes a logical disjunction of an output of the AND circuit 61 and an output of the AND circuit 62. An output of the OR circuit 63 is an MG1_SDWN signal for shutting down the inverter 16, and when both of an output of the AND circuit 61 and an output of the AND circuit 62 are zero, the level of the signal becomes zero, and when at least one of an output of the AND circuit 61 and an output of the AND circuit 62 are one, the level of the signal becomes one. When the level of the MG1_SDWN signal is one, the shutdown of the inverter 16 is performed (the switching is prohibited), and when the level of the MG1_SDWN signal is zero, the shutdown of the inverter 16 is released (the switching is allowed).

An OR circuit 64 also computes a logical disjunction of an output of the AND circuit 61 and an output of the AND circuit 62. An output of the OR circuit 64 is an MG2_SDWN signal for shutting down the inverter 17, and when both of an output of the AND circuit 61 and an output of the AND circuit 62 are zero, the level of the signal becomes zero, and when at least one of an output of the AND circuit 61 and an output of the AND circuit 62 are one, the level of the signal becomes one. When the level of the MG2_SDWN signal is one, the shutdown of the inverter 17 is performed, and when the level of the MG2_SDWN signal is zero, the shutdown of the inverter 17 is released.

In the embodiment, when an overvoltage abnormality of the electric power system 10 (at least one of the high voltage side and the low voltage side) is detected, and it is detected that the vehicle 100 is not in collision, the switching of the inverters 16 and 17 is stopped. Accordingly, it is possible to prevent application of an overvoltage to the element of the inverters 16 and 17, and it is possible to prevent the damage of the elements associated with an overvoltage.

In a case where, due to collision of the vehicle 100, the rechargeable battery 12 is detached, or the relay 21 is turned off, and then the rechargeable battery 12 and the boost converter 15 are disconnected from each other, electrical power of the motor generators 18 and 19 cannot be recovered by the rechargeable battery 12, and in the electric power system 10, the voltage VH of the capacitor 14 or the voltage VL of the capacitor 13 may increase abnormally, and an overvoltage abnormality may be detected. In this case, when the switching of the inverters 16 and 17 is stopped, it becomes difficult to discharge the capacitors 13 and 14 in the electric power system 10, and when the vehicle 100 is in collision, it becomes difficult to rapidly decrease a high voltage in the electric power system 10.

In contrast, in the embodiment, despite detection of an overvoltage abnormality in the electric power system 10 (at least one of the high voltage side and the low voltage side), the switching of the inverters 16 and 17 is performed when it is detected that the vehicle 100 is in collision. Accordingly, when the vehicle 100 is in collision, electrical energy of the electric power system 10 can be rapidly consumed by the motor generators 18 and 19. As a result, it is possible to rapidly decrease an overvoltage of the electric power system 10, and to rapidly prevent a high voltage from remaining in the electric power system 10. In the embodiment, it is possible to properly control the switching of the inverters 16 and 17 depending on whether an overvoltage abnormality occurs and the vehicle is in collision.

Figure 3:
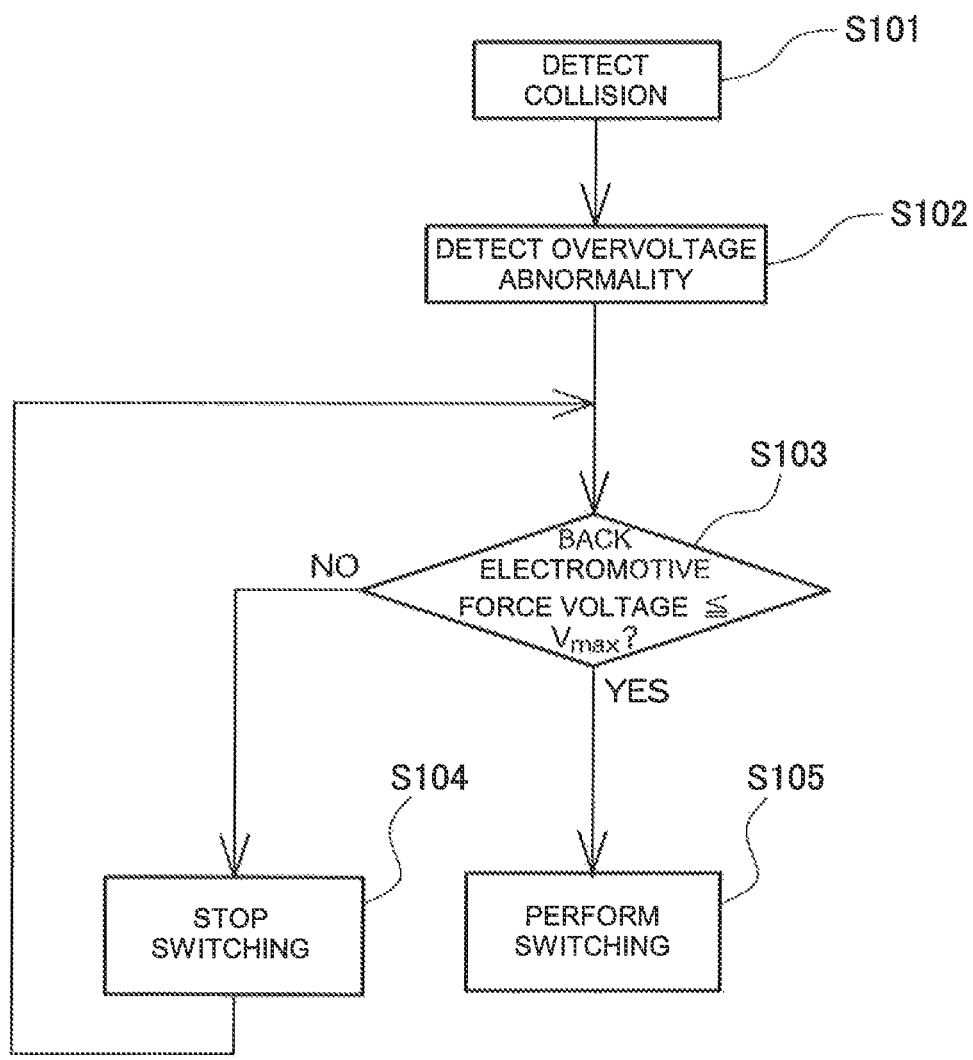
FIG. 3 is a flowchart illustrating an example of a process of determining whether the switching of an inverter is to be performed.

In the embodiment, when an overvoltage abnormality of the electric power system 10 is detected, and it is detected that the vehicle 100 is in collision, the CPU 58 of the switching control unit 56 can also determine whether the switching of the inverters 16 and 17 is performed according to the flowchart illustrated in FIG. 3. In the flowchart illustrated in FIG. 3, in step S101, the collision detection unit 54 detects whether the vehicle 100 is in collision, and in step S102, the overvoltage abnormality detection unit 52 detects an overvoltage abnormality on the high voltage side (the capacitor 14) of the electric power system 10.

In step S103, the CPU 58 of the switching control unit 56 determines whether a back electromotive force voltage of each of the motor generators 18 and 19 is an allowable value Vmax or less. Here, for example, the allowable value Vmax is set to a value lower than the withstanding voltage of the element of each of the inverters 16 and 17. When the back electromotive force voltage of at least one of the motor generators 18 and 19 exceeds the allowable value Vmax, a determination result in step S103 becomes NO, and the process proceeds to step S104. In contrast, when the back electromotive force voltage of each of the motor generators 18 and 19 is the allowable value Vmax or less, a determination result in step S103 becomes YES, and the process proceeds to step S105. Since the back electromotive force voltage of the motor generator 18 (the motor generator 19) is expressed by the multiplication of a rotation speed of the motor generator 18 (the motor generator 19) and a back electromotive force constant, in step S103, it is also possible to determine whether the rotation speed of each of the motor generators 18 and 19 is an allowable value Nmax or less. When the rotation speed of at least one of the motor generators 18 and 19 exceeds the allowable value Nmax, a determination result in step S103 is NO, and the process proceeds to step S104. In contrast, when the rotation speed of each of the motor generators 18 and 19 is the allowable value Nmax or less, a determination result in step S103 is YES, and the process proceeds to step S105.

In step S104, when the collision detection unit 54 detects that the vehicle 100 is not in collision, the CPU 58 maintains the level of the OVH-RG signal at one, and when the collision detection unit 54 detects that the vehicle 100 is in collision, the CPU 58 changes the level of the OVH-RG signal from zero to one. Therefore when the level of the OVH signal is one, an output (logical multiplication of the OVH signal and the OVH-RG signal) of the AND circuit 61 becomes one, and when the level of the OVH signal is zero, an output of the AND circuit 61 becomes zero. That is, when it is detected that the vehicle 100 is in collision (when the level of the OVH-RG signal is zero), and the back electromotive force voltage of each of the motor generators 18 and 19 exceeds the allowable value Vmax, the level of the OVH-RG signal becomes one. As a result, when an overvoltage abnormality on the high voltage side (the capacitor 14) of the electric power system 10 is detected, and the level of the OVH signal becomes one, an output of the AND circuit 61 becomes one, and both of the level of the MG1_SDWN signal of the OR circuit 63 and the level of the MG2_SDWN signal of the OR circuit 64 become one, and the switching control unit 56 stops the switching of the inverters 16 and 17. The process returns to step S103. In contrast, in step S105, since the level of the OVH-RG signal is not changed, when the collision detection unit 54 detects that the vehicle 100 is not in collision, the CPU 58 sets the level of the OVH-RG signal to be one, and when the collision detection unit 54 detects that the vehicle 100 is in collision, the CPU 58 sets the level of the OVH-RG signal to be zero. Therefore, when it is detected that the vehicle 100 is in collision (when the level of the OVH-RG signal is zero), and the back electromotive force voltage of each of the motor generators 18 and 19 is the allowable value Vmax or less, the level of the OVH-RG signal remains zero. As a result, an output of the AND circuit 61 becomes zero. In addition, in a case where it is detected that the vehicle 100 is in collision, since the level of the C-RG signal becomes zero, both of the level of the MG1_SDWN signal of the OR circuit 63 and the level of the MG2_SDWN signal of the OR circuit 64 become zero, the switching control unit performs the switching of the inverters 16 and 17.

There is a problem in that in a case where an overvoltage exceeding the withstanding voltage of the element of each of the inverters 16 and 17 occurs, when the switching of the inverters 16 and 17 is performed, damage to the element may occur. In this regard, according to the flowchart illustrated in FIG. 3, in a case where an overvoltage abnormality is detected on the high voltage side (the capacitor 14) of the electric power system 10, and it is detected that the vehicle 100 is in collision, and when the back electromotive force voltage of each of the motor generators 18 and 19 exceeds the allowable value Vmax, the switching of the inverters 16 and 17 is stopped. Accordingly, the element of each of the inverters 16 and 17 can be prevented from being subjected to an overvoltage exceeding the withstanding voltage of the element. At this time, the switch 22 is turned on, whereby the capacitor 14 is discharged via the discharge resistor 11, and the rotation speed of each of the motor generators 18 and 19 decreases. When the back electromotive force voltage of each of the motor generators 18 and 19 decreases to a voltage less than or equal to the allowable value Vmax, the switching of the inverters 16 and 17 is performed, whereby electrical energy of the electric power system 10 (the capacitor 14) can be rapidly consumed by the motor generators 18 and 19 while the element of each of the inverters 16 and 17 is prevented from being subjected to an overvoltage exceeding the withstanding voltage of the element. Accordingly, it is possible to rapidly decrease the voltage VH of the capacitor 14 while preventing the damage to the elements associated with an overvoltage.

When an overvoltage abnormality of the electric power system 10 is detected, and it is detected that the vehicle 100 is in collision, it is possible to individually determine the execution of the switching of the inverter 16 and the switching of the inverter 17. In this case, when the back electromotive voltage of the motor generator 18 exceeds the allowable value Vmax (when the rotation speed of the motor generator 18 exceeds the allowable value Nmax), the switching of the inverter 16 is stopped, whereby the element of the inverter 16 is prevented from being subjected to an overvoltage exceeding the withstanding voltage of the element. In contrast, when the back electromotive voltage of the motor generator 18 is the allowable value Vmax or less (when the rotation speed of the motor generator 18 is the allowable value Nmax or less), the switching of the inverter 16 is performed, whereby electrical energy of the electric power system 10 is rapidly consumed by the motor generator 18. Similarly, when the back electromotive voltage of the motor generator 19 exceeds the allowable value Vmax (when the rotation speed of the motor generator 19 exceeds the allowable value Nmax), the switching of the inverter 17 is stopped, whereby the element of the inverter 17 is prevented from being subjected to an overvoltage exceeding the withstanding voltage of the element. In contrast, when the back electromotive voltage of the motor generator 19 is the allowable value Vmax or less (when the rotation speed of the motor generator 19 is the allowable value Nmax or less), the switching of the inverter 17 is performed, whereby electrical energy of the electric power system 10 is rapidly consumed by the motor generator 19.

In step S103 in the flowchart illustrated in FIG. 3, the switching control unit 56 can also determine whether the voltage VH on the high voltage side (the capacitor 14) of the electric power system 10 is the allowable value Vmax or less. Here, for example, the allowable value Vmax is set to be greater than the set value VH0 and less than the withstanding voltage of the element of each of the inverters 16 and 17. When VH is greater than Vmax, the process proceeds to step S104, and when VH is Vmax or less, the process proceeds to step S105. In this configuration, in a case where an overvoltage abnormality is detected on the high voltage side (capacitor 14) of the electric power system 10, and it is detected that the vehicle 100 is in collision, and when the voltage VH of the capacitor 14 of the electric power system 10 exceeds the allowable value Vmax, the switching of the inverters 16 and 17 is stopped, whereby the element of each of the inverters 16 and 17 is prevented from being subjected to an overvoltage exceeding the withstanding voltage of the element. At this time, the switch 22 is turned on, whereby the capacitor 14 is discharged via the discharge resistor 11. When the voltage VH of the capacitor 14 of the electric power system 10 decreases to a voltage less than or equal to the allowable value Vmax, the switching of the inverters 16 and 17 is performed, whereby electrical energy of the electric power system 10 (the capacitor 14) is rapidly consumed by the motor generators 18 and 19 while the element of each of the inverters 16 and 17 is prevented from being subjected to an overvoltage exceeding the withstanding voltage of the element.

Figure 4:
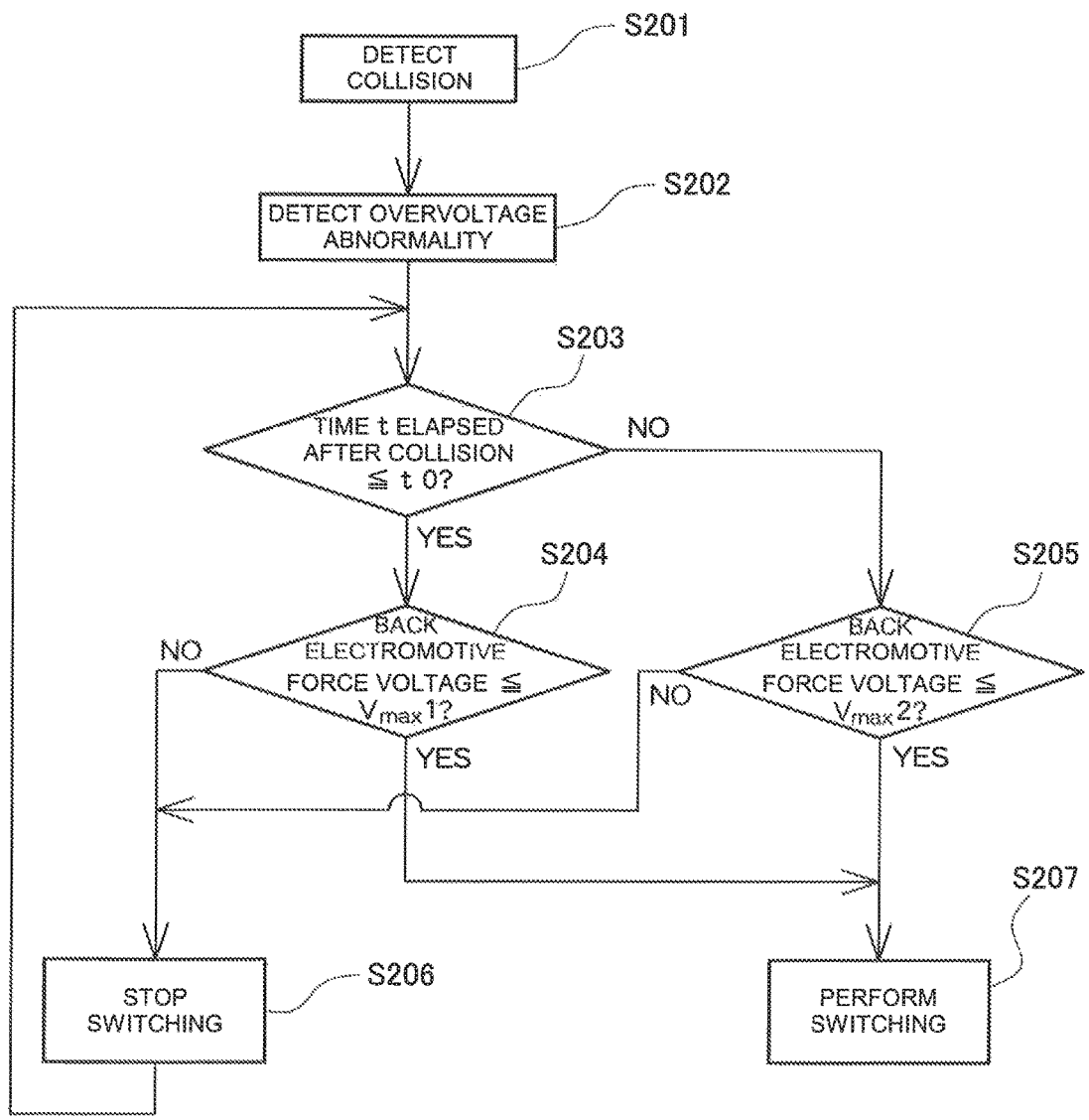
FIG. 4 is a flowchart illustrating another example of the process of determining whether the switching of the inverter is to be performed.

It is also possible to increase the allowable value Vmax with an increase in a time t elapsed from the detection of collision of the vehicle 100. FIG. 4 is a flowchart illustrating an example of this case. In the flowchart illustrated in FIG. 4, in step S201, the collision detection unit 54 detects whether the vehicle 100 is in collision, and in step S202, the overvoltage abnormality detection unit 52 detects an overvoltage abnormality on the high voltage side of the electric power system 10. In step S203, the CPU 58 of the switching control unit 56 determines whether the time t elapsed from the detection of collision of the vehicle 100 is a set time t0 or less. When t is t0 or less, the process proceeds to step S204, and when t is greater than t0, the process proceeds to step S205.

In step S204, the allowable value Vmax is set to Vmax1, and the CPU 58 of the switching control unit 56 determines whether the back electromotive voltage of each of the motor generators 18 and 19 is the allowable value Vmax1 or less. For example, the allowable value Vmax1 is also set to a value less than the withstanding voltage of the element of each of the inverters 16 and 17. When the back electromotive voltage of at least one of the motor generators 18 and 19 exceeds the allowable value Vmax1, a determination result in step S204 is NO, and the process proceeds to step S206. In contrast, when the back electromotive voltage of each of the motor generators 18 and 19 is the allowable value Vmax1 or less, a determination result in step S204 is YES, and the process proceeds to step S207.

In step S205, the allowable value Vmax is set to Vmax2, and the CPU 58 of the switching control unit 56 determines whether the back electromotive voltage of each of the motor generators 18 and 19 is the allowable value Vmax2 or less. For example, the allowable value Vmax2 is also set to a value greater than the allowable value Vmax1, and less than the withstanding voltage of the element of each of the inverters 16 and 17. When the back electromotive voltage of at least one of the motor generators 18 and 19 exceeds the allowable value Vmax2, a determination result in step S205 is NO, and the process proceeds to step S206. In contrast, when the back electromotive voltage of each of the motor generators 18 and 19 is the allowable value Vmax2 or less, a determination result in step S205 is YES, and the process proceeds to step S207.

In step S206, the switching control unit 56 stops the switching of the inverters 16 and 17. The process returns to step S203. In contrast, in step S207, the switching control unit 56 performs the switching of the inverters 16 and 17. The stopping and execution of the switching operation in steps S206 and S207 are the same as those when Vmax is set to Vmax1 or Vmax2 in steps S104 and S105 described above and illustrated in FIG. 3.

In the flowchart illustrated in FIG. 4, when the time t elapsed from collision exceeds the set time t0, compared to the case where the time t elapsed from collision is the set time t0 or less, it is possible to easily establish conditions in which the motor generators 18 and 19 consume electrical energy of the electric power system 10 (the capacitor 14) via the switching of the inverters 16 and 17 by increasing the allowable value Vmax. Accordingly, it is possible to reduce an amount of time for which a high voltage remains in the electric power system 10 after the collision of the vehicle 100 while preventing the element of each of the inverters 16 and 17 from being subjected to an overvoltage exceeding the withstanding voltage of the element.

In step S024 in the flowchart illustrated in FIG. 4, it is also possible to determine whether the rotation speed of each of the motor generators 18 and 19 is an allowable value Nmax1 or less. When the rotation speed of at least one of the motor generators 18 and 19 exceeds the allowable value Nmax1, a determination result in step S204 is NO, the process proceeds to step S206. When the rotation speed of each of the motor generators 18 and 19 is the allowable value Nmax1 or less, a determination result in step S204 is YES, the process proceeds to step S207. In step S205, it is also possible to determine whether the rotation speed of each of the motor generators 18 and 19 is an allowable value Nmax2 or less. Here, the allowable value Nmax2 is set to a value greater than the allowable value Nmax1. When the rotation speed of at least one of the motor generators 18 and 19 exceeds the allowable value Nmax2, a determination result in step S205 is NO, the process proceeds to step S206. When the rotation speed of each of the motor generators 18 and 19 is the allowable value Nmax2 or less, a determination result in step S205 is YES, the process proceeds to step S207.

In step S204 in the flowchart illustrated in FIG. 4, it is also possible to determine whether the rotation speed of each of the motor generators 18 and 19 is an allowable value Nmax1 or less. When the rotation speed of at least one of the motor generators 18 and 19 exceeds the allowable value Nmax1, a determination result in step S204 is NO, the process proceeds to step S206. When the rotation speed of each of the motor generators 18 and 19 is allowable value Nmax1 or less, a determination result in step S204 is YES, the process proceeds to step S207. In step S205, it is also possible to determine whether the rotation speed of each of the motor generators 18 and 19 is an allowable value Nmax2 or less. Here, the allowable value Nmax2 is set to a value greater than the allowable value Nmax1. When the rotation speed of at least one of the motor generators 18 and 19 exceeds the allowable value Nmax2, a determination result in step S205 is NO, the process proceeds to step S206. When the rotation speed of each of the motor generators 18 and 19 is the allowable value Nmax2 or less, a determination result in step S205 is YES, the process proceeds to step S207.

In the flowchart illustrated in FIG. 4, step S205 can be omitted, and in step S203, when t is greater than t0, the process can proceed to step S207. That is, in a case where an overvoltage abnormality of the electric power system 10 is detected, and it is detected that the vehicle 100 is in collision, and when the time t elapsed from the detection of the collision of the vehicle 100 exceeds the set time t0, it is possible to perform the switching of the inverters 16 and 17. Accordingly, it is possible to reduce an amount of time for which a high voltage remains in the electric power system 10 after the collision of the vehicle 100 while preventing the element of each of the inverters 16 and 17 from being subjected to an overvoltage exceeding the withstanding voltage of the element.

The embodiment of the present invention is described above; however, the prevent invention is not limited to the embodiment given, and the present invention can be embodied in various forms insofar as the embodiments do not depart from the spirit of the present invention.

The invention claimed is:

1. An electric power conversion control device for a vehicle, equipped on a vehicle including an electric power system that has an electric power converter for performing electric power conversion via the switching of a switching element, and supplies electrical power from the electric power converter to a rotation machine, said electric power conversion control device for a vehicle comprising:
   a switching control unit configured to control performance of the switching;
   an overvoltage abnormality detection unit configured to detect an overvoltage abnormality of the electric power system; and
   a collision detection unit configured to detect collision of the vehicle, wherein
   when the overvoltage abnormality detection unit detects an overvoltage abnormality, and the collision detection unit detects that the vehicle is not in collision, the switching control unit stops performance of the switching, and
   in a case where the overvoltage abnormality detection unit detects an overvoltage abnormality, and the collision detection unit detects that the vehicle is in collision, and when a voltage of the rotating machine or the electric power system exceeds an allowable value, the switching control unit stops performance of the switching, and
   in a case where the overvoltage abnormality detection unit detects an overvoltage abnormality, and the collision detection unit detects that the vehicle is in collision, and when a voltage of the rotating machine or the electric power system is the allowable value or less, the switching control unit performs the switching and increases the allowable value with an increase in the amount of time elapsed after the collision detection unit detects collision of the vehicle.

2. A vehicle comprising:
   an electric power system that includes an electric power converter for performing electric power conversion via the switching of a switching element, and supplies electrical power from the electric power converter to a rotation machine; and
   a control device including an overvoltage abnormality detection unit configured to detect an overvoltage abnormality of the electric power system, a collision detection unit configured to detect collision of the vehicle, and a switching control unit configured to control performance of the switching, wherein
   when the overvoltage abnormality detection unit detects an overvoltage abnormality, and the collision detection unit detects that the vehicle is not in collision, the switching control unit stops performance of the switching, and
   in a case where the overvoltage abnormality detection unit detects an overvoltage abnormality, and the collision detection unit detects that the vehicle is in collison, and when a voltage of the rotating machine or the electric power system exceeds an allowable value, the switching control unit stops performance of the switching, and
   in case where the overvoltage abnormality detection unit detects an overvoltage abnormality, and the collision detection unit detects that the vehicle is in collision, and when a voltage of the rotating machine or the electric power system is the allowable value or less, the switching control unit performs the switching and increases the allowable value with an increase in the amount of time elapsed after the collision detection unit detects collision of the vehicle.

3. A control method of a control device that is mounted in a vehicle including an electric power system configured to have an electric power converter for performing electric power conversion via the switching of a switching element, and to supply electrical power from the electric power converter to a rotation machine, and that it an overvoltage abnormality detection unit configured to detect an overvoltage abnormality of the electric power system, a collision detection unit configured to detect collision of the vehicle, and a switching control unit configured to control the switching, wherein
   when the overvoltage abnormality detection unit detects an overvoltage abnormality, and the collision detection unit detects that the vehicle is not in collision, the switching control unit stops performance of the switching, and
   in a case where the overvoltage abnormality detection unit detects an overvoltage abnormality, and the collision detection unit detects that the vehicle is in collision, and when a voltage of the rotating machine or the electric power system exceeds an allowable value, the switching control unit stops performance of the switching, and in case where the overvoltage abnormality detection unit detects an overvoltage abnormality, and the collision detection unit detects that the vehicle is in collision, and when a voltage of the rotating machine or the electric power system is the allowable value or less, the switching control unit performs the switching and increases the allowable value with an increase in the amount of time elapsed after the collision detection unit detects collision of the vehicle.

* * * * *